United States Patent [19]

Tokushige et al.

[11] Patent Number: 5,726,220
[45] Date of Patent: Mar. 10, 1998

[54] BIODEGRADABLE POLYMER COMPOSITIONS AND SHRINK FILMS

[75] Inventors: Yuji Tokushige, Ibaraki-ken; Norio Nakamura; Yoichi Tanifuji, both of Tokyo; Shuhei Ueda, Ibaraki-ken, all of Japan

[73] Assignee: Shin-Etsu Chemical Co., Ltd., Tokyo, Japan

[21] Appl. No.: 703,994

[22] Filed: Aug. 28, 1996

[30]  Foreign Application Priority Data

| Aug. 30, 1995 | [JP] | Japan | 7-222126 |
| Sep. 22, 1995 | [JP] | Japan | 7-244012 |
| Sep. 29, 1995 | [JP] | Japan | 7-253063 |
| Sep. 29, 1995 | [JP] | Japan | 7-253064 |

[51] Int. Cl.⁶ ............. C08K 5/09; C08L 23/08; C08L 67/04; C08L 83/08
[52] U.S. Cl. ............. 523/125; 523/124; 524/394; 525/186; 525/190; 525/415; 525/450; 525/479
[58] Field of Search ............. 523/124, 125; 525/186, 190, 415, 450, 479; 524/394

[56]  References Cited

U.S. PATENT DOCUMENTS

| 5,252,646 | 10/1993 | Iovine et al. | 524/270 |
| 5,387,623 | 2/1995 | Ryan et al. | 523/124 |
| 5,470,526 | 11/1995 | Wilfgong et al. | 523/125 |

*Primary Examiner*—Peter A. Szekely
*Attorney, Agent, or Firm*—McAulay Fisher Nissen Goldberg & Kiel, LLP

[57]  ABSTRACT

The present invention provides polylactic compositions effecting an excellent mold releasability upon processing and significantly improved elongation at break and impact strength without affecting the transparency. Also provided is a shrink film which decomposes under the natural environment and has excellent transparency, flexibility, shrinkability and mold releasability upon processing by applying the polylactic acid composition to a shrink film. There is provided a biodegradable polymer composition comprising 100 parts by weight of polylactic acid and 5 to 70 parts by weight of EVA. Further, a biodegradable polymer composition is provided comprising the polymer composition with one or more additives selected from the group consisting of 0.05 to 5 parts by weight of a lubricant, 1 to 50 parts by weight of plasticizer, 0.5 to 5 parts by weight of thermal stabilizer and 0.05 to 5 parts by weight of mold releasing agent. These biodegradable polymer compositions are applied to shrink films.

10 Claims, No Drawings

BIODEGRADABLE POLYMER COMPOSITIONS AND SHRINK FILMS

BACKGROUND OF THE INVENTION

1. Field of the Invention

The present invention relates to a thermoplastic resin having biodegradability and a shrink film using the thermoplastic resin. More particularly, the present invention relates to a polylactic acid composition effecting remarkably improved elongation at break and impact strength, a flexibility suitable for applications to films or bolts, and an excellent mold release property upon processing steps such as kneading, pressing, extrusion and injection, as well as to a shrink film to which said polylactic acid composition is applied.

2. Description of the Related Art

Hitherto, thermoplastic resins such as polyethylene, polypropylene, polystyrene, polyethylene terephthalate and polyvinyl chloride have been widely used in packaging applications, for example, as packaging materials, and as bottles, containers or vessels for detergents, cosmetics and foods. After use, these products are disposed from homes and factories and eventually disposed in a place for landfill disposal of garbage or refuse.

Recently, amounts of these thermoplastic resins used for packaging have significantly increased and accordingly the amounts thereof disposed from homes and factories rapidly increase. As a result, lack of the place for landfill disposal around a big city has become a serious problem. Further, when these packaging thermoplastic resins are disposed into the environment, the thermoplastic resins remain without undergoing decomposition due to their chemical stability resulting in some damage on the view, and contaminate the life environment for marine organisms. These constitute a serious social problem.

On the other hand, heat shrink films hitherto used for packaging foods are mainly of polyvinyl chloride, polyethylene or polystyrene type resins. However, shrink films made of such resins increase the amounts of refuse upon disposal and remain in the earth semipermanently when buried or affect the landscape adversely when left on the ground. Until now, no shrink film has been provided which decomposes in the natural environment.

Accordingly, biodegradable polymers have recently attracted attention in order to solve these problems. As an example of such polymers, reference may be made to polylactic acid. Polylactic acid completely decomposes in a few months in animal bodies. Polylactic acid also begins to decompose within a few weeks and disappear in about one year in wet environment such as in soil or sea water. The decomposition products of polylactic acids are lactic acid, water and carbon dioxide, which are innoxious. Therefore, it has a large potential to make a great contribution to a solution of the environmental problems.

It is known that molded articles obtained from polylactic acid are excellent in transparency and show more excellent mechanical properties as compared with other degradable polymers. However, tensile strength (yield strength, break strength, elongation at break), impact strength and mold release property upon processing are not satisfactory.

SUMMARY OF THE INVENTION

It is an object of the present invention to eliminate such defects and to provide a polylactic acid composition having significantly improved elongation at break and impact strength while maintaining transparency and providing good mold release properties upon processing.

Further, the present invention provides a shrink film using the biodegradable polymer and having an excellent biodegradability in natural environments as well as excellent transparency, mold release property upon processing, flexibility and shrinkability (in particular shrinkability at low temperatures).

The present inventors have keenly studied and, as a result, have obtained polylactic acid compositions effecting good mold release property upon processing, improved elongation at break and improved impact strength while retaining the transparency, that is, a biodegradable polymer composition comprising polylactic acid and ethylene vinyl acetate copolymer (EVA) and a biodegradable polymer composition comprising polylactic acid and EVA with one or more additives selected from the group consisting of a lubricant, a plasticizer, a thermal stabilizer and a mold release agent.

More particularly, there is provided a biodegradable polymer composition comprising 5 to 70 parts by weight of EVA and 100 parts by weight of polylactic acid. Also provided is a biodegradable polymer composition comprising said polymer composition with one or more additives selected from the group consisting of 0.05 to 5 parts by weight of a lubricant, 1 to 50 parts by weight of a plasticizer, 0.5 to 5 parts by weight of a thermal stabilizer and 0.05 to 5 parts by weight of a mold release agent.

Further, by applying these polylactic acid compositions to shrink films, obtained is a biodegradable shrink film having transparency and a good mold release property upon processing as well as excellent flexibility and shrinkability (in particular shrinkability at low temperatures).

The biodegradable polymer used in the present invention is polylactic acid which may be produced by condensation of L-lactic acid, D-lactic acid or a mixture thereof, preferably by ring opening polymerization of lactide which is a cyclic dimer of lactic acid. The lactide includes L-lactide which is a cyclic dimer of L-lactic acid, D-lactide which is a cyclic dimer of D-lactic acid, meso-lactide which is a cyclic dimer of D- and L-lactic acids, and DL-lactide which is a mixture of D- and L-lactides. One or more of these lactides are used. The ring opening polymerization of lactide is preferred since the lactide is easy to polymerize, and a product with a higher degree of polymerization may readily be obtained. The weight average molecular weight of the polylactic acid used in the present invention is not particularly limited but may usually be in the range of 30,000 to 1,000,000, preferably 100,000 to 300,000. Commercially available polylactic acids include ECOPLA™ from Cargill, Inc. and LACTY™ from Shimadzu Corporation.

EVA used in the present invention has an ethylene content of 10 to 70% by weight and a vinyl acetate content of 30 to 90% by weight, preferably an ethylene content of 20 to 40% by weight and a vinyl acetate content of 60 to 80% by weight. If the vinyl acetate content is lower than 30% by weight, the elongation at break will be low. If the vinyl acetate content is above 90% by weight, the Izod impact value will be low. EVA desirably has a molecular weight of 50,000 to 500,000. If the molecular weight is lower than 50,000, the elongation at break, break strength and yield strength will be low. If it exceeds 500,000, the break strength will decrease. EVA is added in an amount of 5 to 70 parts by weight, preferably 20 to 50 parts by weight, based on 100 parts by weight of the polylactic acid. If EVA is less than 5 parts by weight, satisfactory elongation at break or impact strength can not be obtained and the resulting shrink film has poor shrinkability at low temperature. If EVA exceeds 70 parts by weight, the present composition will gives rise to reduced transparency and significantly decreased strength and become so flexible that when made into a film the body of the film will be too soft that a shrink film with a good body can not be obtained. Commercially available EVA includes EVATHLENE™ 250, 310P from Dainippon Ink & Chemicals, Inc.

A polylactic acid composition having improved elongation at break and impact strength and good mold release property upon processing while retaining the transparency is obtained by adding 5 to 70 parts by weight of EVA to 100 parts by weight of polylactic acid.

Further, a biodegradable shrink film excellent in flexibility and shrinkability (in particular at low temperature) having transparency and mold release property upon processing is effected by adding 5 to 70 parts by weight of EVA to 100 parts by weight of polylactic acid.

The lubricant used in the present invention may be any of lubricants used conventionally. For example, fatty acid esters, paraffins, hydrocarbon resins, higher fatty acids, hydroxy-fatty acids, fatty acid amides, alkylene bis-fatty acid amides, lower alcohol esters of fatty acids, polyhydric alcohol esters of fatty acids, polyglycol esters of fatty acids, fatty alcohols, polyhydric alcohols, polyglycols, polyglycerols or aliphatic ketones may be used as lubricant. A mixture of two or more of the above may also be used as lubricant. Preferably, esters or polyethylenes, such as fatty acid esters or polyethylene waxes (hydrocarbon resins), may be used. These are excellent in transparency and mold release property. Illustrative examples thereof include montanic acid butyleneglycol ester wax and low molecular weight polyethylenes. Commercially available products thereof include RIKESUTA™ EW-100 (fatty acid ester sold by Riken Vitamin Co., Ltd.) and Hoechst Wax OP from Hoechst AG.

The lubricant is used in the range of 0.05 to 5 parts by weight, preferably in the range of 0.05 to 2 parts, based on 100 parts by weight of the polylactic acid. With less than 0.05 parts by weight, the effect thereof on the mold release property is insufficient. If the amount exceeds 5 parts by weight, the resulting film slips excessively so that it can not wind around a roll, and its physical properties will be lowered. Polylactic acid, EVA and a lubricant are blended to yield a mixture. If necessary, a stabilizer such as inorganic salt of lactic acid may be added.

A polylactic acid composition effecting significantly improved elongation at break and impact strength and good mold release property upon processing while retaining the transparency is yielded by adding 5 to 70 parts by weight of EVA and 0.05 to 5 parts by weight of a lubricant to 100 parts by weight of polylactic acid.

Further, a biodegradable shrink film excellent in flexibility and shrinkability having transparency and mold release property upon processing is effected by adding 5 to 70 parts by weight of EVA and 0.05 to 5 parts by weight of a lubricant to 100 parts by weight of polylactic acid.

The plasticizer used in the present invention may be any of plasticizers used conventionally and is not particularly limited. In order to impart flexibility and impact strength to the mixture of polylactic acid and EVA, however, aliphatic dibasic acid ester, phthalic acid ester, hydroxy polybasic carboxylic acid ester, polyester type plasticizer, fatty acid ester, epoxy type plasticizer, or polyvinyl acetate, or any mixture thereof is used. Preferable examples are di-2-ethylhexyl azelate (DOZ) and di-2-ethylhexyl adipate. The plasticizer is used in the range of 1 to 50 parts by weight, preferably 5 to 20 parts by weight, against 100 parts by weight of the polylactic acid. Less than 1 part by weight will be insufficient to provide the flexibility. If it exceeds 50 parts by weight, bleeding may occur, non-degradable portions may increase and there is a problem of insufficiet strength.

A polylactic acid composition having significantly improved elongation at break and impact strength and good mold release property upon processing while retaining the transparency is yielded by adding 5 to 70 parts by weight of EVA and 1 to 50 parts by weight of a plasticizer to 100 parts by weight of polylactic acid.

Further, a biodegradable shrink film excellent in flexibility and shrinkability having transparency and mold release property upon processing is effected by adding 5 to 70 parts by weight of EVA and 1 to 50 parts by weight of a plasticizer to 100 parts by weight of polylactic acid.

The present invention provides a biodegradable polymer composition and biodegradable shrink film comprising as a main component a composition comprising polylactic acid, EVA, and optionally a lubricant and/or plasticizer.

In addition to the main component, a thermal stabilizer, a mold release agent and/or a colorant may be added, if necessary.

The thermal stabilizer used in the present invention may be inorganic salt of lactic acid and include, for example, sodium, calcium, aluminum, barium, magnesium, manganese, iron, zinc, lead, silver and copper lactate. One of these salts or a mixture of two or more of these salts may be used. The amount thereof added is 0.5 to 5 parts by weight, preferably 1 to 2 parts by weight, against 100 parts by weight of polylactic acid. The thermal stabilizer used in this range effectively improves the impact strength (Izod impact) and reduces the scattering of the values for elongation at break, break strength and impact strength.

The mold release agent used in the present invention may be silicone oil and include alkyl-modified silicone, methylstyryl-modified silicone, methacrylic acid-modified silicone, polyether-modified silicone, higher fatty acid-containing silicone, higher fatty acid-modified silicone, higher fatty acid ester-modified silicone, higher fatty acid alkoxy-modified silicone and fluorine-modified silicone. One of these silicones or a mixture of two or more of these silicones may be used. Among these, an alkyl-modified silicone and methylstyryl-modified silicone are especially desired. These silicone oils have a viscosity in the range of 100 to 10,000 cs as measured by Ostwald viscometry at 25° C. The silicone oil is added in an amount of 0.05 to 5 parts by weight, preferably 1 to 3 parts by weight, against 100 parts by weight of polylactic acid. The use of these mold release agents is effective in that upon press molding the resulting product may be more readily peeled from the press plate and in that impact strength (Izod impact) is improved and in that the scattering of values for elongation at break, break strength and impact strength is reduced.

According to the present invention, a polylactic acid composition is obtained which effects a good mold releasability upon processing and improved elongation at break and impact strength while retaining the transparency. Further, the polylactic composition of the present invention is also applied to a shrink film to develop a polylactic acid biodegradable shrink film having excellent elongation at break, Izod impact strength and mold releasability and good flexibility and thermal shrinkability, in particular shrinkability at low temperature. The present shrink film is excellent in printability and may be used as a shrink film for labelling.

The polylactic acid composition effecting thus improved flexibility is fully transparent, suitable for processing into molded articles such as shrink films, wrapping films and bottles, and is effective for use in packaging materials, bottles, containers or vessels for detergents, tablewares for first foods, bottles, containers or vessels for cosmetics, fibers and fishing nets.

The polymers effecting significantly improved mold releasability are suitable for continuous manufacture such as extrusion or injection, producing films, packaging materials, various bottles, containers, vessels, fibers, and others efficiently.

DETAILED DESCRIPTION OF PREFERRED EMBODIMENTS

The present invention will be illustrated by the following examples and comparative examples.

Polylactic acid, EVA, thermal stabilizer, mold release agent, lubricant and plasticizer used were as follows. These were blended in relative amounts as shown in Table 1.

Polylactic acid: ECOPLA™ manufactured by Cargill, Inc., weight average molecular weight 168,000;

EVA: EVATHLENE™ 250 manufactured by Dainippon Ink & Chemicals, Inc., ethylene content of 20% by weight and vinyl acetate content of 80% by weight, weight average molecular weight 245,000;

Thermal stabilizer: Sodium lactate manufactured by WAKO Pure Chemical Industries, Ltd.;

Mold release agent: Methylstyryl-modified silicone oil KF-410 manufactured by Shin-Etsu Chemical Co., Ltd. (viscosity of 1,000 cs at 25° C.;

Lubricant: RIKESUTA™ EW-100 (fatty acid ester) manufactured by Riken Vitamin Co., Ltd.;

Lubricant: Hoechst Wax OP manufactured by Hoechst AG;

Lubricant: Polyethylene wax manufactured by Allied Chemical Corp.; and

Plasticizer: DOZ: Di-2-ethylhexyl azelate manufactured by New Japan Chemical Co., Ltd.

The resulting blended mixture was kneaded with a 6 inch roll at 150° C. for 15 minutes to yield a molded roll sheet having a thickness of about 3 mm.

The resulting molded roll sheets were evaluated for the tensile strength, impact strength, mold releasability and transparency in the following tests. The results are shown in Table 1.

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 |
|---|---|---|---|---|---|---|---|---|---|---|---|---|
| Formulated composition (parts by weight) | Polylactic acid | 100 | 100 | 100 | 100 | 100 | 100 | 100 | 100 | 100 | 100 | 100 |
| | EVA | 10 | 43 | 10 | 10 | 10 | 40 | 40 | 40 | 30 | 50 | 0 |
| | RIKESUTA™ EW-100 | 0 | 0 | 0 | 0 | 0 | 1 | 0 | 0 | 0 | 0 | 0 |
| | Hoechst Wax OP | 0 | 0 | 0 | 0 | 0 | 0 | 1 | 0 | 0 | 0 | 0 |
| | Polyethylene wax | 0 | 0 | 0 | 0 | 0 | 0 | 0 | 1 | 0 | 0 | 0 |
| | DOZ | 0 | 0 | 0 | 0 | 0 | 0 | 0 | 0 | 5 | 5 | 0 |
| | Sodium lactate | 0 | 0 | 2 | 0 | 2 | 0 | 0 | 0 | 0 | 0 | 0 |
| | KF-410 | 0 | 0 | 0 | 2 | 2 | 0 | 0 | 0 | 0 | 0 | 0 |
| Tensile strength | Yield strength (kgf/mm$^2$) | 5.25 | 2.55 | 4.85 | 4.70 | 4.62 | 2.50 | 2.48 | 2.35 | 3.20 | 2.42 | 4.30 |
| | Break strength (kgf/mm$^2$) | 3.27 | 2.18 | 2.54 | 2.85 | 2.62 | 2.08 | 2.10 | 2.05 | 2.25 | 0.85 | 4.12 |
| | Elongation at break (%) | 22.8 | 117.6 | 15.0 | 10.5 | 16.8 | 112.5 | 105.8 | 105.4 | 40.5 | 130.8 | 4.4 |
| Izod impact strength (kgf · cm/cm$^2$) | | 9.4 | 70.2 | 12.6 | 15.8 | 16.8 | 66.2 | 67.4 | 68.3 | 75.0 | 90.3 | 2.3 |
| Mold releasability | | B | B | B | A | A | A | A | A | B | A | D |
| Transparency | | B | B | B | B | B | B | B | B | B | B | A |

Tensile test: The resulting molded roll sheet was cut and and press molded at 160° C. under an actual pressure of 50 kgf/cm$^2$ for 8 minutes to prepare a plane plate specimen of 1 mm in thickness for tensile test. This specimen was subjected to the tensile test according to Japanese Industrial Standard (JIS) K-7113.

Izod impact test: The resulting molded roll sheet was cut and two cut samples were superimposed and press molded at 160° C. under an actual pressure of 50 kgf/cm$^2$ for 10 minutes to prepare a plane plate specimen of 3 mm in thickness for Izod impact test. This specimen was subjected to the Izod impact test according to JIS K-7110.

Mold releasability: Peelability from a roll was evaluated. The peelability from the roll is the peelability of the molded sheet from the roll when it is removed from the 6 inch roll. The criteria are as shown below.

A: very easy to peel;

B: easy to peel;

C: slightly difficult to peel;

D: difficult to peel.

Transparency: The plane plate pressed sample of 1 mm in thickness for the tensile test was evaluated for the transparency according to the following criteria:

A: excellent;

B: good;

C: slightly cloudy.

Further, the roll sheets obtained in Example 7 and Comparative Example 1 were subjected to thermal shrink test. The results are shown in Table 2.

TABLE 2

|  | Shrinkage at 45° C. | Shrinkage at 50° C. | Shrinkage at 55° C. | Shrinkage at 60° C. | Shrinkage at 65° C. | Shrinkage at 80° C. | Shrinkage at 90° C. |
| --- | --- | --- | --- | --- | --- | --- | --- |
| Ex. 7 | 0% | 10% | 47% | 52% | 53% | 53% | 54% |
| Comp. Ex. 1 | 0% | 0% | 16% | 57% | 58% | 58% | 59% |

Thermal shrink test: The roll sheets obtained in Example 7 and Comparative Example 1 were cut and press molded at 150° C. under an actual pressure of 50 kgf/cm² for 8 minutes to prepare a film of 0.15 mm in thickness for shrink test, which was then cut into rectangles of 5 cm×10 cm. The film was stretched doubly in the longitudinal direction at 65° C. at a stretching rate of 20 cm/min with a stretching machine. The resulting stretched film was cut to prepare specimens of 45 mm×100 mm for thermal shrink test. The resulting stretched film as a sample for thermal shrink testing was placed between wire gauzes and dipped in a thermostatic water bath preset at any one of 45° C., 50° C., 55° C., 60° C., 65° C., 80° C. or 90° C. for 30 seconds. Then, the longitudinal dimension of the specimen was measured to calculate the percent shrinkage according to the following equation:

$$\text{Percent shrinkage} = [(L_0 - L)/L_0] \times 100$$

wherein $L_0$ is a longitudinal length of a specimen for thermal shrink testing (100 mm) and L is a longitudinal length (mm) of a specimen after dipped into hot water having a testing temperature of any one of 45° C., 50° C., 55° C., 60° C., 65° C., 80° C. or 90° C. for 30 seconds.

We claim:

1. A biodegradable polymer composition comprising a polylactic acid and an ethylene vinyl acetate copolymer having an ethylene content of 20 to 40% by weight and a vinyl acetate content of 60 to 80% by weight.

2. A biodegradable polymer composition comprising a polylactic acid, an ethylene vinyl acetate copolymer having an ethylene content of 20 to 40% by weight and a vinyl acetate content of 60 to 80% by weight, and one or more additives selected from the group consisting of a lubricant, a plasticizer, a thermal stabilizer and a mold release agent.

3. The biodegradable polymer composition according to claim 2, wherein the thermal stabilizer is 0.5 to 5 parts by weight, against 100 parts by weight of the polylactic acid, of an inorganic salt of lactic acid.

4. The biodegradable polymer composition according to claim 2, wherein 0.05 to 5 parts by weight, against on 100 parts by weight of the polylactic acid, of one or more silicone oils are added as said mold release agent.

5. The biodegradable polymer composition according to claim 2, wherein said mold release agent is a silicone oil having a viscosity of 100 to 10,000 cs at 25° C.

6. The biodegradable polymer composition according to claim 2 wherein said mold release agent is one or more selected from the group consisting of alkyl-modified silicones, methylstyryl-modified silicones, methacrylic acid-modified silicones, polyether-modified silicones, $C_{16}$ and higher fatty acid-containing silicones, $C_{16}$ and higher fatty acid-modified silicones, $C_{16}$ and higher fatty acid ester-modified silicones, $C_{16}$ and higher fatty acid alkoxy-modified silicones and fluorine-modified silicones.

7. A biodegradable shrink film comprising a biodegradable polymer composition of claim 1.

8. The biodegradable shrink film comprising a biodegradable polymer composition of claim 2.

9. A biodegradable polymer composition according to claim 1, wherein said ethylene vinyl acetate copolymer is added in an amount of 5 to 70 parts by weight against 100 parts by weight of said polylactic acid.

10. A biodegradable polymer composition according to claim 2, wherein said mold release agent is one or more compounds selected from the group consisting of alkyl-modified silicones, methylstyryl-modified silicones, and mixtures thereof.

* * * * *